Patented Feb. 17, 1925.

1,527,079

UNITED STATES PATENT OFFICE.

ALEXANDER S. RAMAGE, OF DETROIT, MICHIGAN, ASSIGNOR TO INTERNATIONAL COLOR AND CHEMICAL COMPANY, INCORPORATED, OF DETROIT, MICHIGAN, A CORPORATION OF MICHIGAN.

PROCESS OF PREPARING LIGHT, READILY-LIQUEFIED HYDROCARBONS FROM ETHYLENE AND GASES CONTAINING THE SAME.

No Drawing.   Application filed February 16, 1921.  Serial No. 445,570.

*To all whom it may concern:*

Be it known that I, ALEXANDER S. RAMAGE, a citizen of the United States, residing at Detroit, in the county of Wayne and State of Michigan, have invented certain new and useful Improvements in Processes of Preparing Light, Readily-Liquefied Hydrocarbons from Ethylene and Gases Containing the Same, of which the following is a specification.

The present invention relates to the preparation of light, liquefiable hydrocarbons from ethylene ($C_2H_4$) and gases containing the same, and comprises the production of hydrocarbons of the $C_4H_8$ series from these by polymerization.

I have discovered that if ethylene or an ethylene-containing gas is compressed into a heavy hydrocarbon solvent, such as kerosene, and the resulting liquid is appropriately heated, a light, easily-liquefied gaseous product is recoverable. The ethylene gas is polymerized and a new product results.

The following examples will serve to illustrate the invention:

About 1000 c. c. of kerosene from which any fractions below 250° C. were removed was confined in a closed tube equipped with a suitable relief valve and externally packed with ice. Ethylene in a substantially pure condition was pumped into the tube under 80 pounds pressure. When the pressure remained stationary after pumping the relief valve was opened and the kerosene transferred to a flask; this operation being repeated four times and using in all about 73,000 c. c. of ethylene for about 4,000 c. c. of kerosene. On distillation in the flask, this yielded a condensate up to 180° C., but principally coming over at 38° C. and under. With the use of about 92 grams of ethylene there was recovered about 110 c. c. of a liquid of .65 specific gravity, weighing about 72 grams. The condensate showed the principal component to be butylene, and then amylene, with small amounts of octylene and decylene. The product contained no appreciable proportion of paraffins.

As an example of the polymerization process as applied to gases containing ethylene, I may refer to the treatment of the gas which results from the usual oil-cracking process from which all condensable olefins have been extracted either by washing or passing through concentrated sulfuric acid, and which, roughly, may be composed of hydrogen 40 per cent, methane 30 per cent, carbon monoxid 20 per cent and ethylene 10 per cent.

If such gas is compressed into kerosene or other hydrocarbon solvent, under a pressure of from 100 to 200 pounds per square inch, the ethylene is dissolved until the kerosene contains about fifteen times its volume of the gas. Now if the kerosene thus charged is heated to 120°—150° C. all of the gas is liberated, but will be found to be of the $C_4H_8$ series, with a thermal value of 3750 B. t. u's per cubic foot, or about twice that of acetylene. The product is easily liquefied. At normal temperatures it will readily liquefy at twenty pounds pressure.

In the above examples I have referred to the use of kerosene as the hydrocarbon solvent. This term as herein used is intended to include any suitable hydrocarbon of the rather broad range of distillates generally known under that head. Obviously, as indicated, other heavy hydrocarbon solvents may be used.

The pressures and temperatures required to carry out the invention will vary of course with the particular circumstances. The reference to a pressure of 80 pounds per sq. in. and a temperature of that of melting ice is empirical and is made by way of example only. Greater pressures and higher temperatures may be employed, the only requirement in this respect being to get the etheylene in solution, when the polymerization takes place. The well known rule for the solution of gases applies, viz the higher the temperature of the solvent, the higher the pressure required for solution.

In the appended claims it is to be understood that the words "gases containing ethylene" include ethylene alone as well as gases in which ethylene is a component in any substantial proportion.

I claim:—

1. The process of preparing light, readily-liquefied polymerization products from gases containing ethylene, which comprises compressing the gas into a heavy hydrocarbon solvent and recovering the polymerization products from the charged solvent by distillation.

2. The process of preparing light, readily-liquefied polymerization products from gases containing ethylene, which comprises compressing the gas into kerosene and recovering the polymerization products from the charged kerosene by distillation.

3. The process of preparing light, readily-liquefied polymerization products from gases containing ethylene, which comprises compressing the gas into kerosene under a pressure of approximately 80 pounds per square inch and at about the temperature of melting ice, and recovering the polymerization products from the charged kerosene by distillation.

4. The process of preparing butylene from ethylene which comprises compressing the ethylene into a heavy hydrocarbon solvent and distilling the charged solvent.

5. The process of preparing butyline from ethylene which comprises compressing the ethylene into kerosene and distilling the charged kerosene.

6. Process of preparing polymerization products of ethylene which comprises compressing an ethylene-containing gas into a liquid hydrocarbon solvent.

7. Process of preparing polymerization products of ethylene which comprises compressing an ethylene-containing gas into kerosene from which fractions below 250° C. have been separated.

8. Process of making polymerization products of ethylene which comprises compressing a gas containing ethylene into a hydrocarbon solvent under a pressure of from 100 to 200 pounds per square inch.

In testimony whereof, I affix my signature.

ALEXANDER S. RAMAGE.